P. W. PETERSEN.
REFRIGERATING APPARATUS.
APPLICATION FILED APR. 13, 1921.

1,388,295.

Patented Aug. 23, 1921.
5 SHEETS—SHEET 1.

Inventor:
Paul W. Petersen,
Byrnes, Addington, Ames & Seibold
Attys.

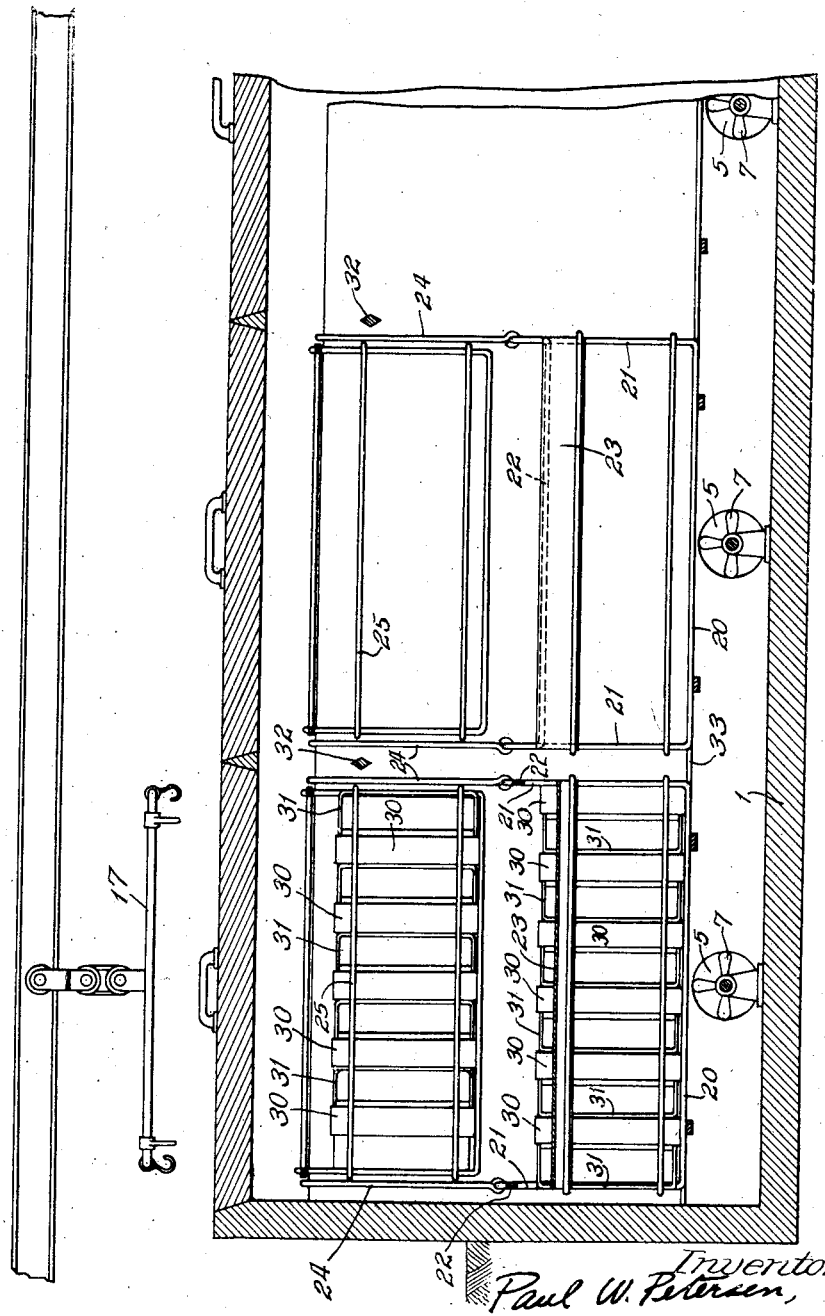

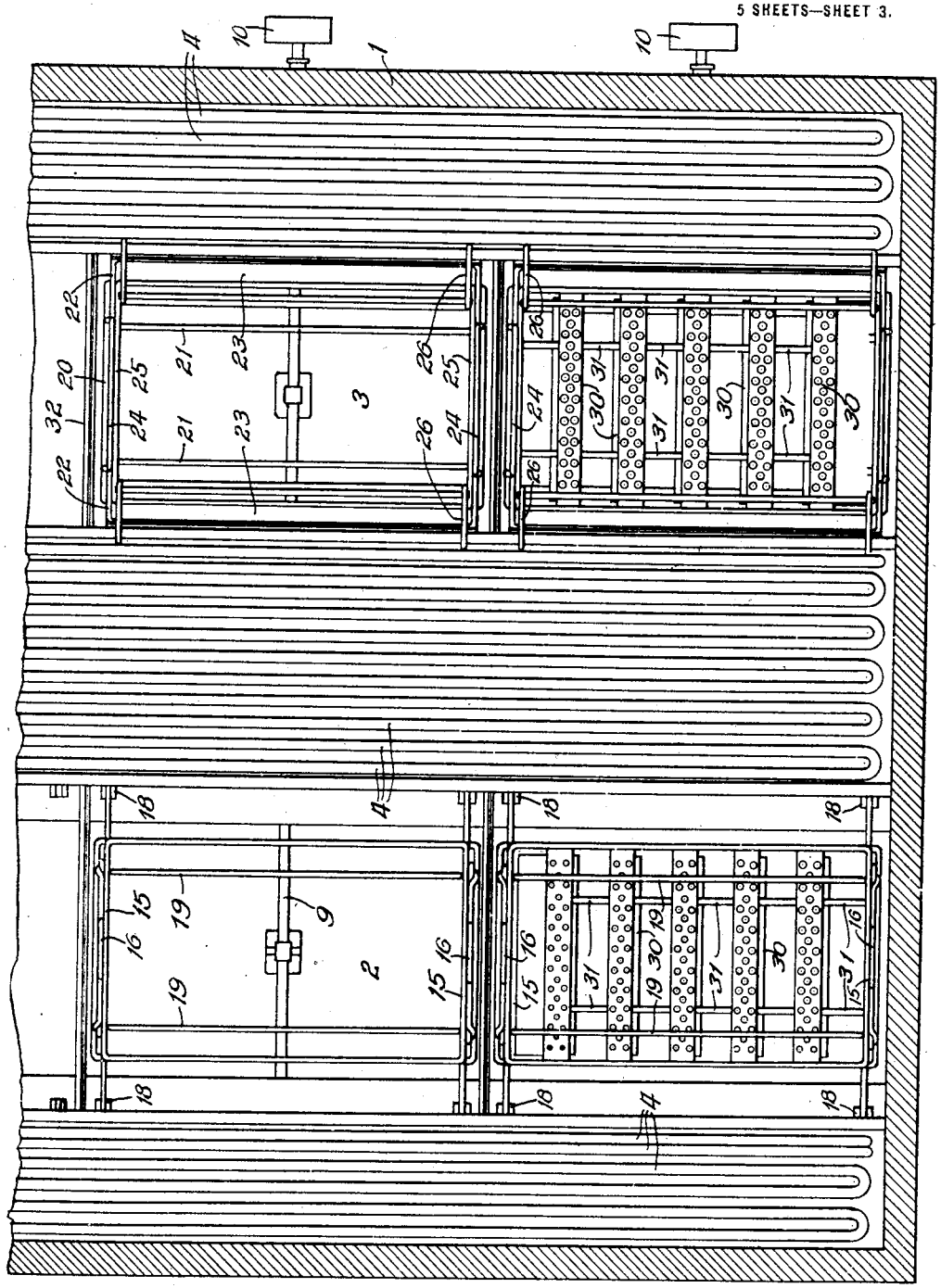

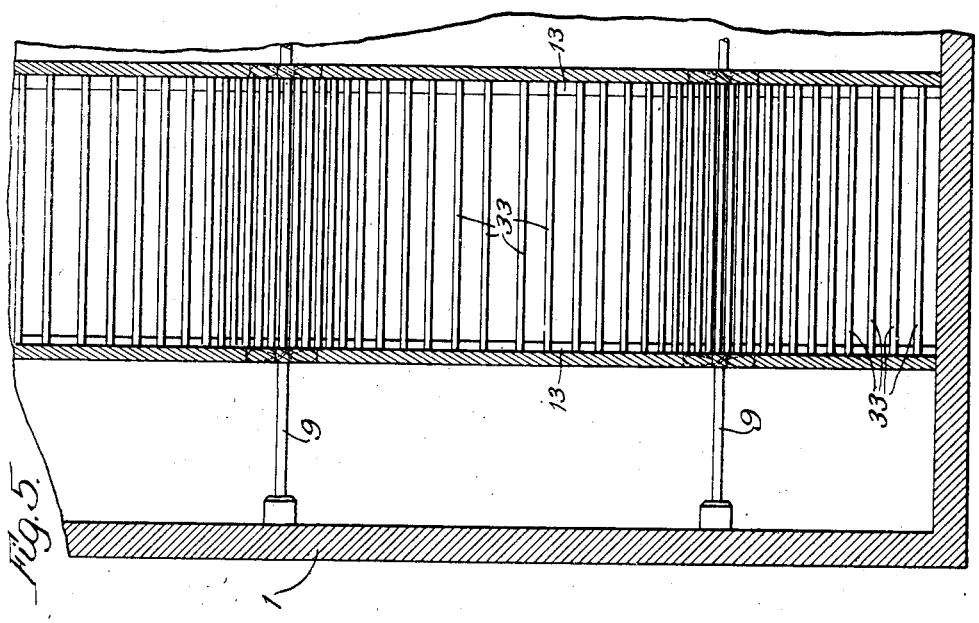
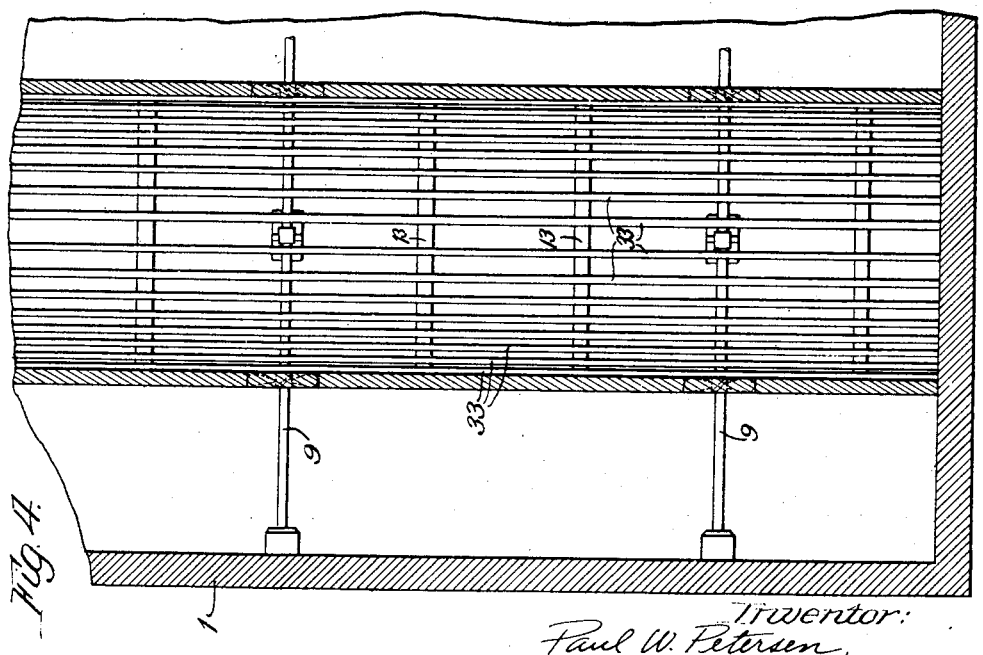

P. W. PETERSEN.
REFRIGERATING APPARATUS.
APPLICATION FILED APR. 13, 1921.

1,388,295.

Patented Aug. 23, 1921.
5 SHEETS—SHEET 5.

Inventor:
Paul W. Petersen
By Jones, Addington, Ames & Seibold.
Attys.

UNITED STATES PATENT OFFICE.

PAUL W. PETERSEN, OF CHICAGO, ILLINOIS.

REFRIGERATING APPARATUS.

1,388,295. Specification of Letters Patent. Patented Aug. 23, 1921.

Application filed April 13, 1921. Serial No. 460,970.

*To all whom it may concern:*

Be it known that I, PAUL W. PETERSEN, a citizen of the United States, residing at Chicago, in the county of Cook and State of Illinois, have invented new and useful Improvements in Refrigerating Apparatus, of which the following is a full, clear, concise, and exact description, reference being had to the accompanying drawing, forming a part of this specification.

My invention relates to apparatus for the treatment of comestibles and it has special reference to devices whereby large quantities of comestibles may be simultaneously and economically treated in a cooling or refrigerating liquid for preserving them.

More particularly my invention refers to apparatus for the chilling or freezing of comestibles such as fruits, vegetables, meats, fish and the like which, when in their fresh state, are placed in containers before the comestibles are subjected to the preserving treatment which is accomplished through the medium of my present invention.

In accordance with my invention, after the comestibles to be treated are placed in the containers, the containers are then immersed in a refrigerant in order to subject the comestibles to the desired treatment, the containers, of course, being so designed as to permit the refrigerant to come in direct contact with the inclosed comestibles. The purpose of my present invention permits this chilling or freezing treatment to be carried out on a large commercial basis whereby comestibles may be treated in quantities and be expeditiously handled with economy.

The containers in which the comestibles are inclosed constitute temporary holders only for the purpose of freezing the comestibles into cakes or blocks. In some instances, particularly for treating fish of large size, one such article only may be placed in a single container in order to properly chill it. In other instances, it may be found desirable to pack a number of articles or comestibles in a single container in order to freeze them into a solid block which subsequently is removed from the container.

After the comestibles have been frozen or chilled through by the treatment conducted by my apparatus, they may then be stored or transported with the assurance that they will retain their freshness both as to appearance and composition.

An object, therefore, of my present invention is to provide apparatus for chilling or refrigerating comestibles which is capable of treating them economically on a large scale and, at the same time, is economical to install and operate, such apparatus contemplating the use of a liquid refrigerant wherein the comestibles are immersed for being chilled or frozen.

For a better understanding of the nature, scope and characteristic features of my present invention, reference may be had to the following description and the accompanying drawings in which—

Fig. 2 is a side view, partially in cross section, taken along the line 2—2 of Fig. 1;

Fig. 3 is a plan view taken along the line 3—3 of Fig. 1;

Fig. 4 is a plan view of a preferred form showing the construction of the false bottom which may be built into one of the compartments of Fig. 1;

Fig. 5 is a plan view of a modified form of false bottom construction;

Figure 1:
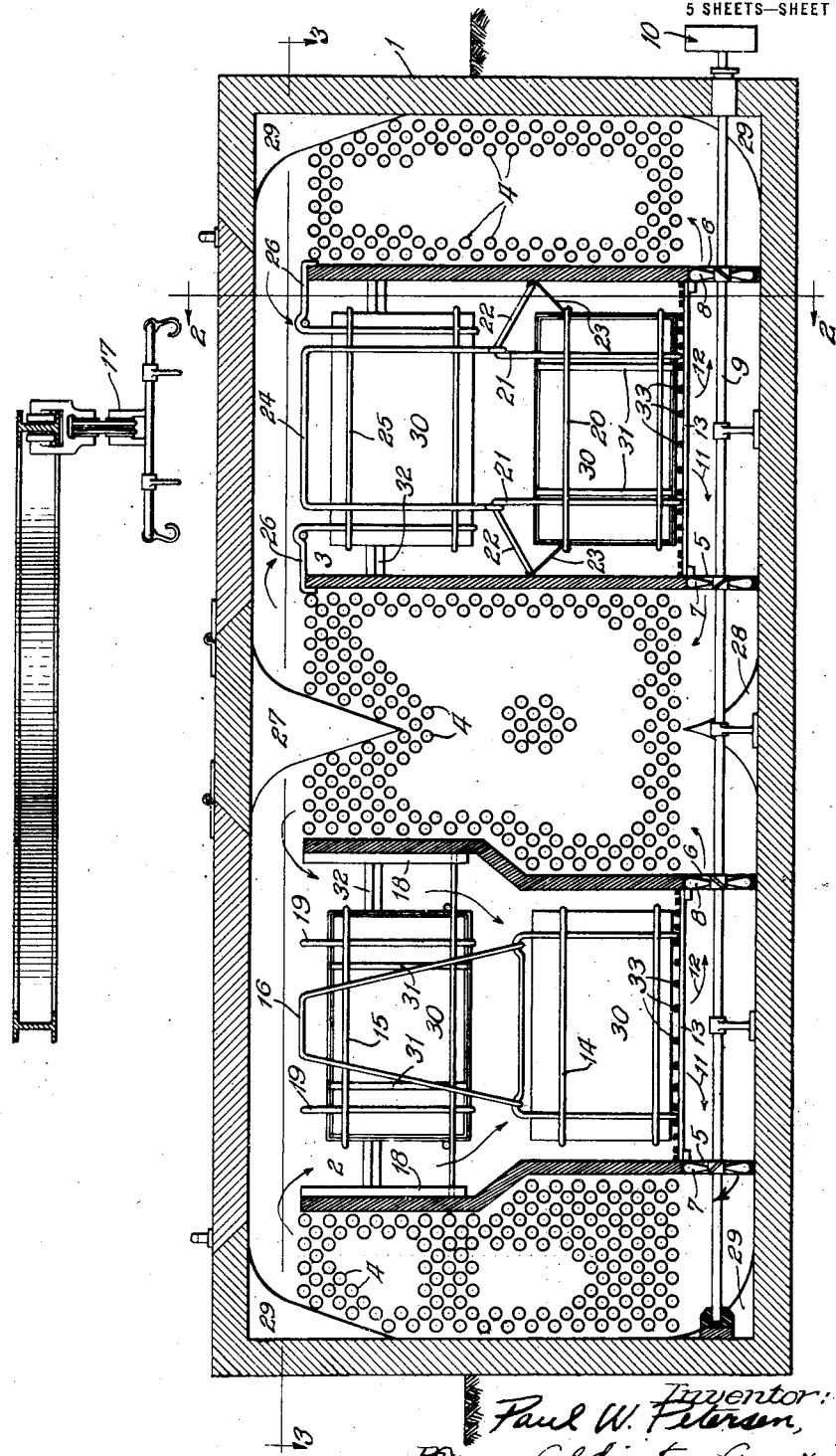
Figure 1 is an end view, particularly in section, of a refrigerating plant constructed in accordance with my invention, the left portion of this figure showing one type of compartment and racks for supporting containers holding the comestibles to be treated and the right portion of this figure showing a modified form of compartment and associated supporting racks.

Referring to Figs. 1, 2 and 3, an inclosed tank 1 built of any proper non-corrosive material, such as water-proof concrete or wood, contains a plurality of longitudinally extending compartments 2 and 3 which, in this particular instance, are shown as two only. But it is to be understood that any suitable number of such compartments may be housed in the tank 1 and spaced from one another substantially as shown. The compartments 2 and 3 are spaced from each other and are immediately adjacent to a plurality of refrigerating coils 4, which as shown in Fig. 3, extend parallel to the compartments through the length of the tank 1. The space between the compartments 2 and 3 is so related to the open spaces on the outer sides of the compartments 2 and 3 that, as the refrigerant is circulated in the tank 1 and through these compartments, it will have a substantially uniform rate of flow throughout.

In the plant shown in Fig. 1, the space intermediate the compartments 2 and 3 is substantially equal to the space on the outer side of the compartment 2 plus the space on the outer side of the compartment 3. The cooling coils 4 are completely submerged in the liquid refrigerant contained within the tank 1 and the cooling medium circulating in the coils 4 is permitted to flow from the upper level of the coils to the lower level. In this fashion, the upper level of the refrigerant is maintained at a substantially lower temperature than the lower level or portion of the refrigerant. It is to be noted that the pipes 4 are staggered relatively to one another so that the entire outer surface thereof is effective in cooling the refrigerant.

Each of the walls of the compartments 2 and 3 is provided at its lower portion with a plurality of openings 5 and 6 which are spaced from one another longitudinally of the tank as shown in Fig. 2. Propellers 7 and 8 are disposed respectively in the openings 5 and 6, which propellers are mounted on a common shaft 9 that is driven through the agency of power applied to an exterior pulley 10. The pitches of the propellers 5 and 6 are so selected that they draw the refrigerant contained within the compartments 2 and 3 outwardly in opposite directions as indicated by the arrows 11 and 12. In this fashion, the end thrusts separately developed by the propellers 7 and 8 are neutralized and, as a consequence, there is substantially no unbalanced end thrust imposed upon the bearings supporting the common shafts 9.

Each compartment 2 and 3 is provided with a false bottom 13 which is shown in detail in Fig. 4. The false bottoms 13 are supported by the walls forming the compartments 2 and 3 and are disposed above the openings 5 and 6 through which the refrigerant is drawn from the compartments.

Contained in compartment 2, the racks 14 and 15, each of which embodies an open frame work construction. The lower rack 14 rests directly upon the false bottom 13 and is provided with lifting handles 16 whereby the rack 14 with its associated containers 30 may be lifted from the compartment by means of a hoist 17. The upper rack 15 is spaced from the lower rack 14 and is supported by means of side brackets 18 which are secured to the walls of the compartment 2. The rack 15 is also provided with upstanding handles 19 whereby it may be lifted from the compartment by means of the hoist 17.

It is to be noted that the walls forming the compartment 2 are oppositely inclined near their center portions to each other to form a restriction in the cross section of the compartment. It will also be noted that as a result of this construction the containers 30 held in the upper rack 15 are spaced relatively wider distances from the two side walls of the compartment 2 than are the containers 30 supported in the lower rack 14. The purposes for forming this restricted portion in the compartment 2 are to permit some of the refrigerating solution to come in contact with the lower containers 30 without coming in contact with the upper containers 30, the inclined portions of the side walls permitting the refrigerating liquid immediately adjacent to the side walls at the upper portion of the compartment to be directed upon the lower containers 30. In this fashion, highly cooled refrigerating liquid which has not had its temperature lowered by reason of coming in contact with the upper containers 30 is brought directly into contact with the lower containers 30. Again, the restricted portion in the compartment 2 increases the rate of flow of the refrigerant through the lower half of the compartment. In this manner, the lower containers 30 are cooled as effectively as the upper containers 30. The direction of flow of the forced circulation of the refrigerant through the compartment 2 is indicated by means of arrows which are self explanatory.

Referring to the second compartment 3, I have shown a lower rack 20, likewise of open work construction, which comprises two spaced lifting handles 21 that are provided with outwardly and downwardly extending portions 22. The outer ends of the portions 22 are secured to baffle plates 23 which are secured along one of their sides to the extensions 22 and to the other of their sides to the frame work of the rack 20, substantially as shown in Fig. 2. The baffles 23, in this instance, serve substantially the same purpose as the restricted portion formed in the compartment 2 by means of its inwardly inclined walls. The handles 21 of the rack 20 are provided with upstanding and accessible lifting handles 24 which may be engaged by the hoist 17. As the hoist 17 engages the lifting handles 24, the extensions 22 will draw the baffle plates 23 toward each other and away from possible contact with the walls of the compartment 3, thereby permitting the rack 20 to be readily withdrawn from the compartment.

An upper rack 25 is provided with laterally extending arms 26 which project over the top of the side walls of the compartment 3 thereby supporting the rack with its containers directly from the upper portions of the walls of the compartment. The refrigerant is circulated through the compartment 3 in substantially the same manner as through the compartment 2.

It is to be observed that centrally disposed baffle plates 27 and 28, as well as baffle plates 29 disposed at the corners of the tank 1 are provided in order to permit of an even and uniform circulation of the refrigerant through the compartments 2 and 3 as well as through the intervening spaces between the compartments and between the compartments and the walls of the tank.

By arranging the compartments as above described I have insured that the space within the tank shall be most economically and advantageously employed. The equilization of the cubic contents of the space without the refrigerating compartments and the space within said compartments eventuates an optimum employment of the tank whereby a maximum quantity of comestibles is treated in a minimum space. It will be noted, furthermore, that I have arranged a plurality of compartments on one level which fact contributes, in a marked degree, to the efficiency of my apparatus.

Referring to Fig. 2, I have shown at the right hand portion thereof, the arrangement of the racks 20 and 25 with their associated containers. The lower rack 20 holds a plurality of containers 30 in which the comestibles to be treated are contained. The containers 30 are shown in detail in Fig. 10, but it is to be observed that they are provided with spacing members 31 which space the containers from one another a distance preferably equal to or greater than the depth of one of the containers 30. In this fashion, the containers are separated from one another a substantial distance whereby the refrigerant, in adequate quantities, is permitted to circulate adjacent to each side of each container.

Containers 30 supported in the upper rack 25 are likewise spaced from one another by reason of the spacers 31, but it is to be noted that the containers 30 of the upper rack 25 are staggered relatively to the containers supported in the lower rack 21. In this fashion, one container is not immediately above or below another container so that the refrigerant is permitted to circulate with great effectiveness through the compartments. The racks disposed in each compartment are separated from one another by longitudinal spacers 32 which are diamond-shaped in cross section and disposed substantially as shown in order to guard the racks from injury as they are being withdrawn from the tank by means of the hoist 17.

In Fig. 3 I have shown the position that the containers 30 occupy in the racks. It may be herein pointed out again that the containers are spaced from one another by reason of the spacers 31 in order to insure a proper and satisfactory circulation of the refrigerant.

In Fig. 4, it will be noted that the false bottom of the compartments 2 and 3 is made up of a series of spaced bars 33 forming a lattice work construction, substantially as shown. The spaces between the bars 33 at the central portion of the compartment are greater than the spaces between the bars as the side walls of the compartment are approached. This variable spacing between the bars 33 insures that the open spaces in the false bottom immediately adjacent to the propellers are more restricted than the spaces more distant from the propellers. The suction developed by the propellers is thus compensated for so that the flow of liquid immediately adjacent to the propellers is maintained at substantially the same rate as the flow of liquid in the central portion of the compartment. In this fashion, the flow of refrigerant through the cross sectional area of the compartment 2 is maintained substantially uniform.

Substantially the same effect may be obtained by using the false bottom construction shown in Fig. 5 in which the bars 33 are extended transversely of the compartment and the spacing between the bars immediately adjacent to the propellers is considerably less than the spacing between the bars intermediate between the propellers. This graduated spacing serves to create a substantially uniform flow of the refrigerant through the compartments.

Figure 6:
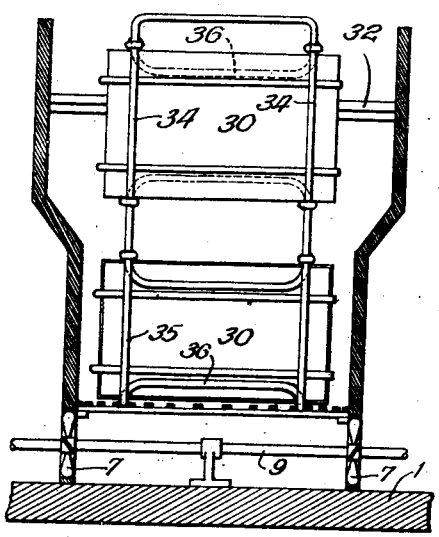
Fig. 6 is an end view, partially in elevation, of a modified form of a compartment and rack for supporting a plurality of containers in which comestibles may be disposed.
Figure 7:
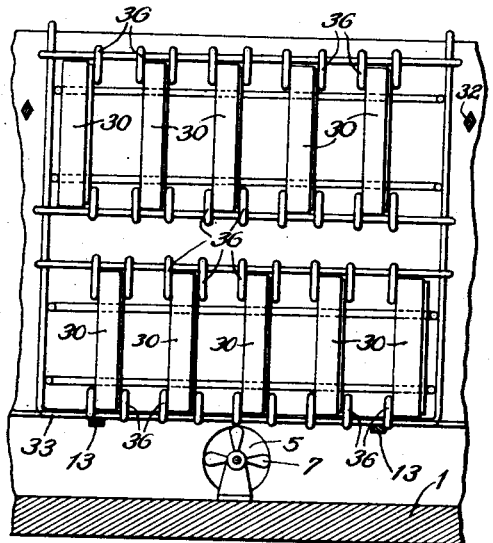
Fig. 7 is a side view of the apparatus of Fig. 6.

In Figs. 6 and 7 I have shown an open work rack having upper and lower levels 34 and 35, respectively, in both of which levels the containers 30 are disposed but, in this instance, the containers 30 are held apart from one another by reason of spacers 36 which are secured directly to the frame work of the rack levels 34 and 35. By referring to Fig. 7, it will be observed that the containers 30 in the upper rack level 34 are staggered with respect to the containers 30 supported in the lower rack level 35. Again, it is to be noted that the spacers 36 are so positioned that they divide the rack levels into a plurality of container-receiving spaces, alternate spaces being equal, but adjacent spaces being unequal. This permits the rack levels 34 and 35 to be utilized for containers of different depths and yet insures that, if all the containers used at one time are of equal depth, said containers in the upper level will be staggered with respect to those in the lower level.

In placing the containers 30 in the rack levels 34 and 35, as well as in the other racks heretofore described, the racks are turned on end and the containers are inserted in a manner similar to the insertion of horizontal drawers in a cabinet. This permits of the convenient handling of the containers as well as their insertion and withdrawal from their supporting racks. After a rack has thus been filled with its containers, the rack is turned through an angle of 90° so as to lie on its long side whereby it may then be handled conveniently by means of the hoist 17. Because of this method of packing the containers, all of the lower level rack handles are hinged to be swung out of the way during the filling process.

Figure 8:
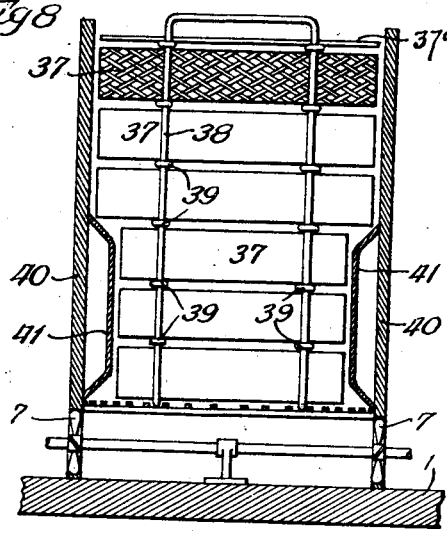
Figs. 8 and 9 are end and side views respectively of another form in which my invention may be embodied.
Figure 9:
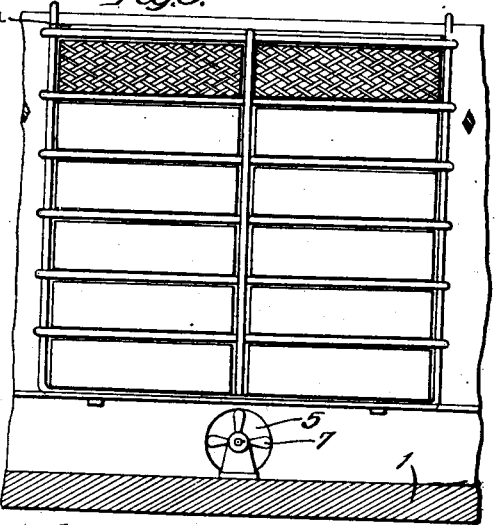

In Figs. 8 and 9, containers 37 which may be in the form of an open work basket constructed having perforated sides and bottom or a basket having a perforated bottom and closed sides are held in racks 38 which are provided with a series of spacers 39 which serve as supports, as well as spacers for separating the containers 37 from one another. The comestibles which, in this instance are shown as fish, are disposed in the racks 37 substantially as shown. It will be noted that the baskets successively act as lids for each other inasmuch as the vertical distance maintained between them by the spacers 39 is quite small. In order to maintain the comestibles in the uppermost basket an empty basket may be placed thereover or, as shown in Figs. 8 and 9, a metal plate 37ª may overlie the top basket. In this instance the fish are being chilled in the temporary containers 37 and after their treatment therein are withdrawn. The side walls 40 of the compartment are provided at their lower portion with expanded portions 41 that are turned toward each other in order to provide a restricted cross section for the lower portion of the compartment. The baffle plates 41 serve the same purpose as the restricted portions formed in the walls of the compartment 2 of Fig. 1.

Figure 10:
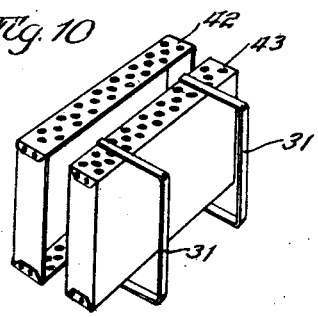
Fig. 10 is a perspective view showing a container for comestibles which may be employed in the supporting racks comprised in my refrigerating apparatus.

In Fig. 10 I have shown a form of container which is suitable as a temporary holder for the comestibles which may be used in conjunction with the racks shown in Figs. 1, 2 and 3, as well as in the racks shown in Figs. 6 and 7, if the spacers 31 are dispensed with. The container comprises a lid 42 and a box portion 43, the lid being telescopic with reference to the box portion. The spacers 31 as secured to the box portions 43 in any suitable manner. This permits of a very economical structure which may be expeditiously handled. The sides of both the box portion 43 and the lid 42 are perforated while the ends thereof are shown as being imperforate. In this fashion, the refrigerant is permitted to come in direct contact with the comestibles that are contained within the container.

While these containers are of such dimensions that, for sake of illustration only, 5 may be placed in a rack when the telescoping lids fit all the way down over the body of the container or 4 may fill the rack if the containers are filled to their maximum capacity and the lids are almost off, it is of course, possible to provide for intermediately filled containers by utilizing a lid or a special spacer to fill out the rack if the space consumed by the filled containers is equal to, say, 4½ containers. Again it should be noted that the reversal of the spacers (see Fig. 2) results in the desirable staggered positioning of the upper and lower containers.

Figure 11:
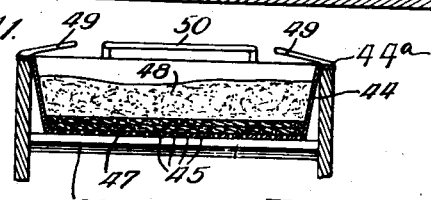
Fig. 11 is a cross sectional view of a filter tray that may be used in connection with my refrigerating apparatus.

In Fig. 11, I have shown a filter tray which is useful in filtering the refrigerant in order to remove therefrom foreign particles and other undesirable matter that may be held in suspension in the refrigerant.

The filter pan of Fig. 11 comprises a holder 44 that is adapted to fit over the tops of the walls forming the compartments 2 and 3 of Fig. 1 whereby the compartments may be completely bridged. The lowermost portion only of the pan 44 is perforated as shown at 45 and is supported transversely by means of the transverse bars 32 which constitute a part of the permanent structure of the tank. The pan 44 is also supported by the marginal flanges 44ª which extend over the top of the walls, as shown. Disposed in the pan 44 is a layer of cloth material such as felt or excelsior 47 and above this a proper filtering material such as sand or charcoal 48. The pan 44 may be lifted through the agency of the lifting handles 49 and 50 which may be engaged by the hooks secured to the hoist 17. The pan 44 is placed in position when the racks holding the containers are withdrawn from the compartments. The propellers are then rotated in order to create a forced circulation of the refrigerant which is passed through the filter pan 44. In this manner the refrigerant is properly cleansed.

I have shown the pan only partially filled but it is, of course, possible to vary the filtering material therein to any amount within the holding capacity of the pan. Only so much of such material is placed in the pan as will not impede the flow of the refrigerant to be cleansed therethrough, the amount varying in proper proportion to the section exerted by the propellers.

While I have herein described a refrigerating plant or apparatus embodying one form of my invention, it is to be understood that I do not desire to be limited to the specific structure herein shown inasmuch as many modifications may be made herein which are within the scope of any skilled mechanic. Therefore, I desire that such limitations only be placed upon my invention as are set forth in the appended claims forming a part of my present specification.

Having thus described my invention what I now claim as new and desire to secure by Letters Patent is:

1. In a refrigerating apparatus, a tank containing a refrigerant, compartments therein embodying means for supporting the comestibles during their refrigeration, the space without said compartments being approximately equal to the space within said compartments, and means for circulating said refrigerant downwardly through said compartments and around said comestibles.

2. In a refrigerating apparatus, a tank containing a refrigerant, compartments therein embodying superposed means for supporting comestibles during their refrigeration, means for circulating said refrigerant downwardly through said compartments and around said comestibles, and means whereby the temperature of the refrigerant passing over the lower comestibles is lowered by the addition to the refrigerant which has effected the upper comestible of a quantity of refrigerant which has not been warmed by too close proximity to the upper comestible.

3. In a refrigerating apparatus, a tank containing a refrigerant, compartments therein embodying superposed means for supporting comestibles during their refrigeration, means for circulating said refrigerant downwardly through said compartments and around said comestibles, and means for dividing the downwardly flowing refrigerant into two parts and thereafter passing one part over the upper comestible but both parts over the lower comestible.

4. In a refrigerating apparatus, a tank containing a refrigerant, compartments therein embodying means for supporting comestibles during their refrigeration, means for circulating said refrigerant downwardly through said compartments and around said comestibles, and means comprising a perforated bottom member in said compartments whereby the downwardly flowing refrigerant is distributed uniformly over the area of the comestibles.

5. In a refrigerating apparatus, a tank containing a refrigerant, compartments therein embodying means for supporting comestibles during their refrigeration, means for circulating said refrigerant downwardly through said compartments and around said comestibles, and means whereby the downwardly flowing refrigerant is distributed uniformly over the area of the comestibles.

6. In a refrigerating apparatus, a tank containing a refrigerant, compartments therein embodying superposed means for supporting comestibles, means for circulating said refrigerant downwardly through said compartments, means for cooling the refrigerant descending from the upper comestible unto the lower comestible, and means for distributing the refrigerant uniformly over said comestibles.

7. In a refrigerating apparatus, a tank containing a refrigerant, compartments therein embodying superposed means for supporting comestibles, means for circulating said refrigerant downwardly through said compartments, means for cooling the refrigerant descending from the upper comestibles unto the lower comestible and for increasing the rate of flow of the refrigerant passing over said lower comestible, and means for distributing the refrigerant uniformly over said comestibles.

8. In a refrigerating apparatus, a tank containing a refrigerant, compartments therein embodying superposed means for supporting comestibles, means for circulating said refrigerant downwardly through said compartments, means for cooling the refrigerant descending from the upper comestible unto the lower comestible and for increasing the rate of flow of the refrigerant passing over said lower comestible by adding thereto a quantity of refrigerant which has not been warmed by close proximity to the upper comestible, and means for distributing the refrigerant uniformly over said comestibles.

9. In a refrigerating apparatus, a tank containing a refrigerant, compartments therein embodying superposed means for supporting comestibles, means for circulating said refrigerant downwardly through said compartments, means for cooling the refrigerant descending from the upper comestible unto the lower comestible, and means comprising a bottom member for said compartments so perforated that the natural tendency, of the refrigerant to accumulate at the walls of the compartments near said circulating means, is overcome and said refrigerant is uniformly distributed over the comestibles.

10. In a refrigerating apparatus, a tank containing a refrigerant, compartments therein embodying superposed means for supporting comestibles, means for circulating said refrigerant downwardly through said compartments, means for cooling the refrigerant descending from the upper comestible unto the lower comestible and for increasing the rate of flow of the refrigerant passing over said lower comestible comprising a restricted portion in said compartments in the vicinity of the lower comestible support, and means for distributing the refrigerant uniformly over said comestibles.

11. A refrigerating apparatus for the treatment of comestibles comprising a tank adapted to hold a refrigerant, a compartment therein which is spaced from the walls of the tank and is provided with a perforated bottom spaced from the bottom of the tank, cooling coils intermediate the tank and said compartment, and means for establishing a forced circulation of the refrigerant downwardly through said compartment.

12. A refrigerating apparatus for the treatment of comestibles comprising a tank adapted to hold a refrigerant, a compartment therein, a removable open-work holder in said compartment, perforated containers disposed in said holder, cooling coils exterior of said compartment, and means for establishing a forced circulation of the refrigerant downwardly through said compartment and in contact with the said containers and upwardly exteriorly of the compartment and in contact with said cooling coils.

13. In a refrigerating apparatus, a tank containing a refrigerant, compartments therein embodying superposed means for supporting comestibles, said means having substantially the same transverse area, means for circulating said refrigerant downwardly through said compartment, each of said compartments having a greater transverse area in the vicinity of the upper comestible support than it has in the vicinity of the lower support whereby a space extends between the compartment walls and the upper comestible support to divide said downwardly flowing refrigerant into two parts, one part affecting the upper comestible and the other part flowing unwarmed through said annular space, means comprising deflecting portions in each of said compartments for combining the two portions of said refrigerant and to cause the entire amount to flow over the lower comestible whereby the rate of flow thereover is increased, and means comprising a perforated bottom member for said compartments to insure a uniform distribution of the refrigerant over the transverse area of the comestibles.

14. A refrigerating apparatus comprising a tank adapted to hold a refrigerant, a compartment spaced from the side walls and bottom thereof, propellers placed intermediate the bottom of said tank and the bottom of said compartment to effect a forced circulation of the refrigerant, and a rotatable shaft for the propellers, said propellers having a reversed pitch in order to substantially eliminate the end thrust on said shaft when said refrigerant is being circulated.

15. In a refrigerating apparatus, a compartment in which comestibles are disposed and through which a refrigerant is circulated, and means for insuring a uniform flow of said refrigerant over the cross-sectional area of said compartment and all the comestibles therein.

16. In a refrigerating apparatus, a refrigerating compartment in which comestibles are disposed, means for maintaining a forced circulation of a refrigerant therethrough, and means for nullifying the natural tendency of said refrigerant to have an intensified flow in the vicinity of said circulating means and insure a uniform flow of said refrigerant over the cross-sectional area of said compartment and all the comestibles therein.

17. In a refrigerating apparatus, a refrigerating compartment in which comestibles are disposed, means for maintaining a forced circulation of a refrigerant therethrough, and means comprising a transverse perforated partition across said tank, the perforations therein decreasing in size as said circulating means are approached for nullifying the natural tendency of said refrigerant to have an intensified flow in the vicinity of said circulating means and insure a uniform flow of said refrigerant over the cross-sectional area of said compartment and all the comestibles therein.

In witness whereof, I have hereunto subscribed my name.

PAUL W. PETERSEN.

Witnesses:
 GEO. W. HANSEN,
 A. ARNOLD BRAND.